(12) United States Patent
Saulle

(10) Patent No.: US 7,032,745 B2
(45) Date of Patent: Apr. 25, 2006

(54) DOSING CAP FOR POWDERS OR LIQUIDS

(75) Inventor: Lorenzo Saulle, Carpiano (IT)

(73) Assignee: Liteco S.R.L., (IT)

( * ) Notice: Subject to any disclaimer, the term of this patent is extended or adjusted under 35 U.S.C. 154(b) by 0 days.

(21) Appl. No.: 11/022,642

(22) Filed: Dec. 28, 2004

(65) Prior Publication Data

US 2005/0139622 A1    Jun. 30, 2005

(30) Foreign Application Priority Data

Dec. 30, 2003   (IT) ............................ MI2003A2619

(51) Int. Cl.
   *B65D 25/08*   (2006.01)

(52) U.S. Cl. ........................................ 206/219; 222/83

(58) Field of Classification Search .................. 222/83; 206/219
   See application file for complete search history.

(56) References Cited

U.S. PATENT DOCUMENTS

| 3,156,369 | A  | * | 11/1964 | Bowes et al. ................ 206/222 |
| 6,003,728 | A  |   | 12/1999 | Elliott |
| 6,644,471 | B1 |   | 11/2003 | Anderson |
| 2004/0104247 | A1 |   | 6/2004 | Anderson |
| 2004/0188282 | A1 |   | 9/2004 | Anderson |
| 2004/0195120 | A1 |   | 10/2004 | Anderson |

* cited by examiner

*Primary Examiner*—Philippe Derakshani
(74) *Attorney, Agent, or Firm*—Rothwell, Figg, Ernst & Manbeck, PC

(57) ABSTRACT

A dosing cap (1) for powders or liquids including an outer body (2) designed to be inserted into the neck of the container to which the cap (1) is applied and an inner body (3) of a substantially cylindrical shape, which contains the powder or liquid, is mobile inside the outer body (2), and is designed to break the sealing membrane (5) of the dosing cap (1) in response to an axial pressure exerted on its top part. Housed in the inner body (3) is a body (4), preferably cylindrical in shape, which is adjacent to the internal surface of the inner body (1) and is designed to break the sealing membrane (5) of the dosing cap (1) in response to an axial pressure exerted on its top part. Preferably the body (4) is fixed to the sealing membrane (5) of the dosing cap (1).

11 Claims, 2 Drawing Sheets

DOSING CAP FOR POWDERS OR LIQUIDS

FIELD OF THE INVENTION

The present invention relates to a dosing cap containing a powder or a liquid to be mixed, exclusively at the moment of its use, with a liquid contained in the container (normally a bottle or a flask) to which the cap is applied.

DESCRIPTION OF THE BACKGROUND ART

The above dosing caps are widely used, in particular in the pharmaceutical sector, for keeping one (more) easily degradable component, contained in the cap, separate from a second (more) stable component, contained in the container, until the moment of use.

With explicit reference to the pharmaceutical field, if an active principle (for example an antibiotic or a vitamin complex) is (more) easily degradable when it is dissolved in the component contained in the flask, it is a common procedure to contain said active principle in the cap in a (more) stable form (for example, in the form of a liquid or powder) and to mix it, at the moment of use, with the component contained in the flask, breaking a membrane that seals the cap.

In known dosing caps, the component contained in the cap is set inside a body having a substantially cylindrical shape, which is mobile within the body of the cap inserted in the neck of the container; by exerting a pressure on the (substantially) cylindrical body, its bottom edge breaks the sealing membrane causing the contents of the cap to drop into the liquid present in the container.

In known dosing caps, the bottom edge of the (substantially) cylindrical body has an inclined profile, like the mouthpiece of a flute, which presents the drawback of breaking off at least part of the sealing membrane of the cap, causing the broken part to drop into the liquid contained in the container.

SUMMARY OF THE INVENTION

The purpose of the present invention is to provide a dosing cap which is free from the aforesaid drawback. Said purpose is achieved according to the invention by providing a dosing cap which presents the characteristics described herein.

Further characteristics of the invention will emerge more clearly from the ensuing detailed description with reference to some embodiments thereof, which are provided purely by way of example and hence are non-limiting; they are illustrated in the annexed plate of drawings, in which:

DETAILED DESCRIPTION OF THE INVENTION

In the attached figures, corresponding elements will be designated by the same reference numbers.

Figure 1:
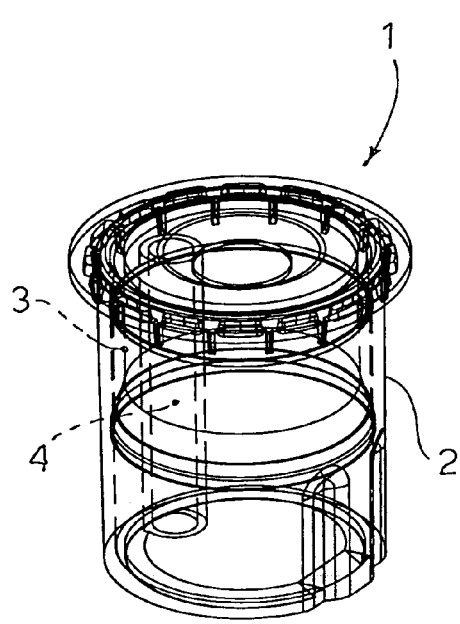
FIG. 1 is a schematic illustration of a see-through view of a dosing cap made according to the present invention.

FIG. 1 is a schematic illustration of a see-through view of a dosing cap made according to the present invention, designated as a whole by 1.

The cap 1 comprises an outer body 2—designed to be inserted into the neck of the container 10 (FIGS. 5 and 6) to which the cap 1 is applied—and an inner body 3, which contains the powder or liquid (omitted in the attached figures for reasons of simplicity of graphic representation) and which is axially mobile within the outer body 2.

Housed inside the inner body 3 is a body 4 (more clearly visible in the cross-sectional view of FIG. 3), which is adjacent to the internal surface of the inner body 3 and is designed to break, in response to an axial pressure exerted on the top part of the inner body 3, the sealing membrane 5 of the dosing cap 1 (FIG. 3), enabling the powder or liquid contained in the cap 1 to drop into the liquid contained in the container 10.

In the preferred embodiment described herein, the body 4 is a cylindrical body but, without departing from the scope of the invention, the body 4 may have the cross section deemed in each case to be most advantageous for meeting the specific needs.

On account of the eccentric position of the body 4, the sealing membrane 5 is not separated completely from the outer body 2, to which it remains connected in the (strengthened) area diametrally opposite to that on which the body 4 acts: it is thus obtained that at least part of the membrane 5 is prevented from possibly dropping into the container 10 to which the cap 1 is applied.

In the preferred embodiment described herein, the body 4 is fixed to the sealing membrane 5 of the dosing cap 1 but, without departing from the scope of the invention, the body 4 may be fixed to the top part of the inner body 3. In this latter case, it is advisable to provide means, set within the inner body 3 and adjacent to the sealing membrane 5, designed to keep the body 4 in position.

Advantageously, the outer body 2, the sealing membrane 5, and the body 4 are formed by a single body made of a plastic material.

Advantageously, also the inner body 3 is made of a plastic material.

Figure 2:
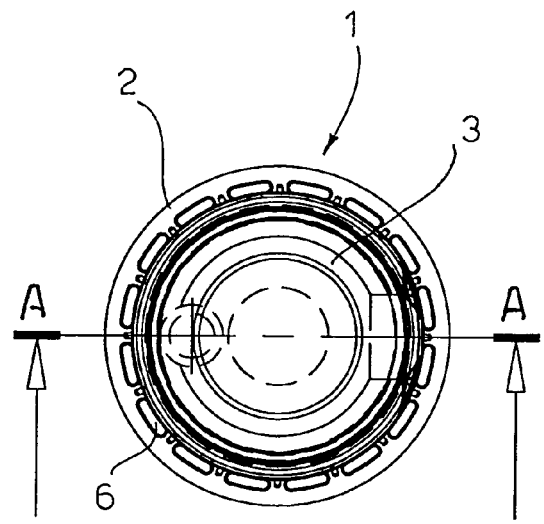
FIG. 2 is a top view of the cap of FIG. 1.

FIG. 2 shows a view from above of the cap 1. Visible in FIG. 2 is a plurality of compartments 6 (only one of which is identified by the corresponding reference number for simplicity of graphic representation), made in the internal wall of the outer body 2—along the periphery of which they are uniformly distributed—and designed to set the inside of the container 10 in communication with the outside environment after breaking of the sealing membrane 5, enabling the contents of the container 10 to be assumed without having to remove the cap 1.

Figure 3:
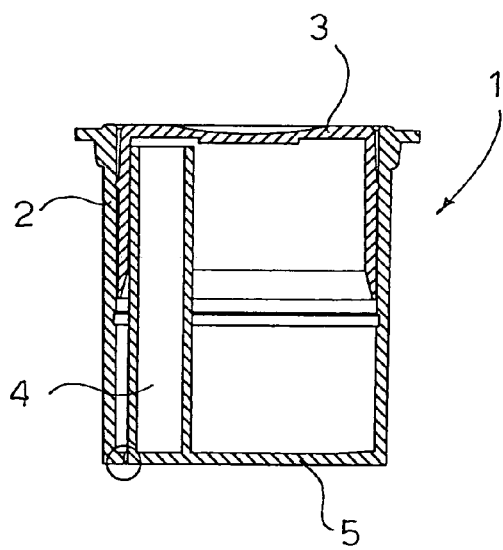
FIG. 3 shows the cap of FIG. 1 sectioned according to the plane A—A of FIG. 2.

FIG. 3 shows the cap 1 sectioned according to the plane A—A of FIG. 2. Visible in FIG. 3 are the outer body 2, the inner body 3, inside which the body 4 and the sealing membrane 5 of the cap 1 are present.

Figure 4:
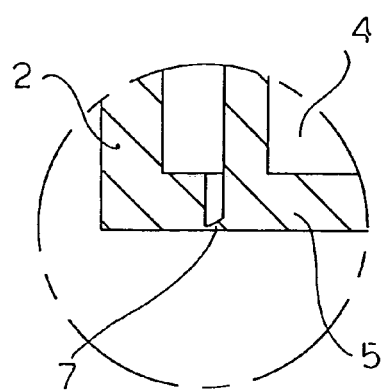
FIG. 4 is a schematic illustration, at an enlarged scale, of the detail highlighted in FIG. 3.

FIG. 4 is a schematic illustration, at an enlarged scale, of the detail highlighted in FIG. 3, from which it emerges that the single body, which comprises the outer body 2, the sealing membrane 5, and the body 4, has an area of pre-prepared breaking 7 of the sealing membrane 5, set between the edge of the outer body 2 and that of the body 4.

Figure 6:
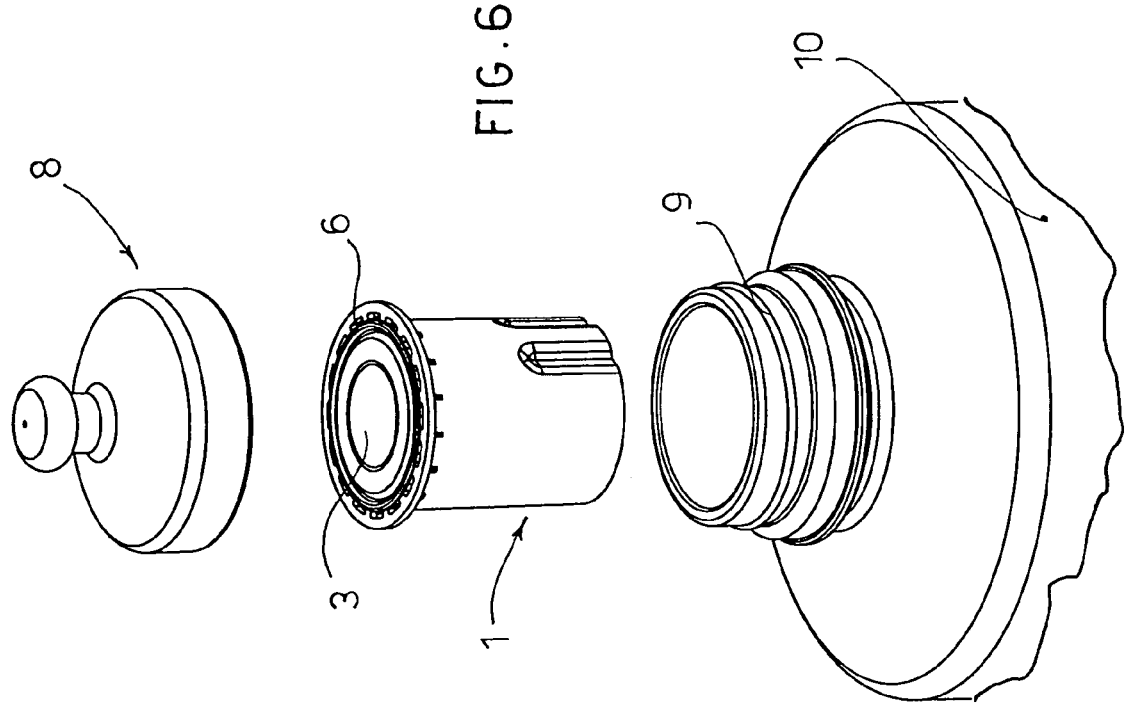
FIGS. 5 and 6 are, respectively, an exploded side view and an exploded perspective view of a possible variant of the cap of FIG. 1.
Figure 5:
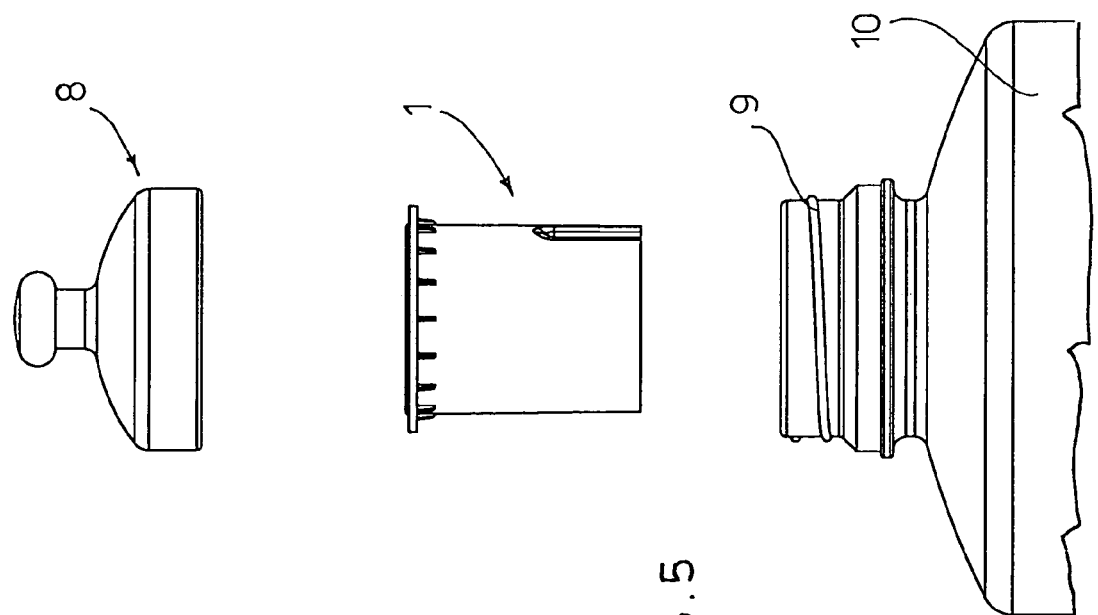

FIGS. 5 and 6 show, respectively, an exploded side view and an exploded perspective view of a possible variant of the cap forming the subject of the present invention, which differs from the one illustrated in the previous figures basically on account of the fact that it further comprises a dispensing element 8 which can be applied to the neck of the container 10 on top of the dosing cap 1.

Preferably, the dispensing element 8 is fixed to a threaded area 9 present on the neck of the container 10.

Said dispensing element 8 enables the contents of the container 10 to be assumed more easily, said contents coming out of the seats 6 after the membrane 5 has been broken.

The above embodiment of the cap 1 can advantageously be used in combination with a container 10 formed by a drinking bottle or the like: the contents of the cap 1 (for example, an energy beverage or an integrator of mineral salts) are dissolved in the liquid present in the flask 10, and the liquid thus enriched, coming out from the seats 6 and the dispensing element 8, can be assumed.

Without departing from the scope of the invention, a person skilled in the art can make to the cap forming the subject of the present invention all the modifications and improvements suggested by his own experience and by the natural evolution of techniques.

What is claimed is:

1. A dosing cap (1) for powder or liquid comprising an outer body (2)—designed to be inserted into the neck of a container (10) to which the cap containing the powder or liquid (1) is applied—and an inner body (3), which mobile within the outer body (2), said cap being characterized in that housed in the inner body (3) is a body (4), adjacent to the internal surface of the inner body (3), designed to break the sealing membrane (5) of the dosing cap (1) in response to an axial pressure exerted on the top part of the inner body (3).

2. The dosing cap (1) of claim 1, wherein the body (4) is fixed to the sealing membrane (5) of the dosing cap (1).

3. The dosing cap (1) of claim 1, wherein the body (4) is fixed to the top part of the inner body (3).

4. The dosing cap (1) of claim 1, wherein the body (4) is a cylindrical body.

5. The dosing cap (1) of claim 1, wherein the outer body (2), the body (4) and the sealing membrane (5) are formed by a single body made of a plastic material.

6. The dosing cap (1) of claim 5, wherein the single body comprising the outer body (2), the body (4) and the sealing membrane (5) has an area of pre-set breaking (7) of the sealing membrane (5) set between the edge of the outer body (2) and that of the body (4).

7. The dosing cap (1) of claim 1, wherein also the inner body (3) is made of a plastic material.

8. The dosing cap (1) of claim 1, wherein it comprises a plurality of compartments (6) made in the internal wall of the outer body (2) and designed to set the inside of the container (10) in communication with the outside environment after breaking of the sealing membrane (5).

9. The dosing cap (1) of claim 8, wherein the compartments (6) are uniformly distributed along the periphery of the internal wall of the outer body (2).

10. The dosing cap (1) of claim 1, wherein it further comprises a dispensing element (8), which can be applied to the neck of the container (10) on top of the dosing cap (1).

11. The dosing cap (1) of claim 10, wherein the dispensing element (8) is fixed to a threaded area (9) present on the neck of the container (10).

* * * * *